United States Patent [19]

Scott

[11] Patent Number: 5,498,668
[45] Date of Patent: Mar. 12, 1996

[54] BLENDS OF CERTAIN POLYESTERS WITH ACRYLICS

[75] Inventor: Christopher E. Scott, Watertown, Mass.

[73] Assignee: Eastman Chemical Company, Kingsport, Tenn.

[21] Appl. No.: 336,131

[22] Filed: Oct. 31, 1994

[51] Int. Cl.$^6$ .................................................. C08L 67/02
[52] U.S. Cl. ........................... 525/173; 524/174; 524/176
[58] Field of Search ..................................... 525/173, 174, 525/176; 528/302, 307

[56] References Cited

U.S. PATENT DOCUMENTS

| | | | |
|---|---|---|---|
| 2,534,028 | 12/1950 | Izard | 260/75 |
| 2,578,660 | 12/1951 | Auspos et al. | 260/75 |
| 2,643,989 | 6/1953 | Auspos et al. | 260/75 |
| 2,647,885 | 8/1953 | Billica | 260/75 |
| 2,742,494 | 4/1956 | Mraz | 260/475 |
| 2,901,466 | 8/1959 | Kibler et al. | 260/75 |
| 3,441,525 | 4/1969 | Kern et al. | 260/4 |
| 3,562,200 | 2/1971 | Jones et al. | 525/176 |
| 3,580,965 | 5/1971 | Brinkmann et al. | 525/176 |
| 3,591,659 | 7/1971 | Brinkmann et al. | 525/174 |
| 3,594,450 | 7/1971 | Herwig et al. | 525/174 |
| 3,657,389 | 4/1972 | Caldwell et al. | 525/176 |
| 4,288,572 | 9/1981 | Karim et al. | 525/176 |
| 4,551,521 | 11/1985 | McConnell et al. | 528/307 |
| 4,581,288 | 4/1986 | Barnhart et al. | 428/325 |
| 4,950,717 | 8/1990 | Seymour et al. | 525/173 |
| 5,260,379 | 11/1993 | Blakeley et al. | 525/176 |
| 5,300,573 | 4/1994 | Patel | 525/176 |

FOREIGN PATENT DOCUMENTS 2-308260  12/1990  Japan.

OTHER PUBLICATIONS

PCT WO92/03505 published Mar. 2, 1992.
R. G. Bauer, et al., Adv. Chem. Ser., 99, 251 (1971).
Biangardi, et al., Die Angew. Makromole. Chemie, 183, 221 (1990).
L. Bohn, Polymer Handbook 2nd Ed., Eds. J. Brandrup and E. H. Immergut, p. III–211, Wiley Interscience, New York (1975).
H. Breur, J. Grzesitza, Die Angew. Makromol. Chemie, 45, 1 (1975).
H. Lin, et al., Polymer Engr. Sci., 32, 344 (1992).
W. J. MacKnight, et al., Polymer Blends, vol. I, Eds. D. R. Paul, S. Newman, p. 185, Academic Press, New York (1978).
R. E. Skochdopole, et al., Polym. Engr. Sci., 27, 627 (1987).

*Primary Examiner*—Veronica P. Hoke
*Attorney, Agent, or Firm*—Betty J. Boshears; Harry J. Gwinnell

[57] ABSTRACT

This invention relates to a blend comprising: (A) an aliphatic or cycloaliphatic polyester or copolyester and (B) an acrylic polymer or copolymer.

14 Claims, No Drawings

BLENDS OF CERTAIN POLYESTERS WITH ACRYLICS

FIELD OF THE INVENTION

This invention relates to clear, immiscible blends of certain aliphatic or cycloaliphatic polyesters with acrylic polymers or copolymers.

BACKGROUND OF THE INVENTION

The vast majority of two-phase polymer blends form articles which are visually opaque and thus, cannot be used in applications requiring clarity. It is unusual to find blends of two polymers which form two-phase materials in the solid state and which are also visually clear.

Refractive indices of polymers vary over a broad range. For instance, many polymers have refractive indices in the range of 1.35 to 1.65. It is exceptional to find a pair of polymers where the refractive index difference is similar so that visually clear blends of the two immiscible components are formed.

It is known that the matching of refractive indices of polymer pairs can result in visually clear articles of the blends of the two polymers. L. Bohn, *Polymer Handbook*, 2nd ed., pp. 111–211, Wiley Interscience, New York ((1975); J. MacKnight et al., *Polymer Blends*, Vol. I, p. 185, Academic Press, New York (1978). Biangardi et al., *Die Angew. Makromole. Chemie*, 183, 221 (1990), have developed model calculations which quantify this phenomena and evaluate the light scattering of certain blends as a function of particle diameter, refractive index, wavelength, and particle structure.

Bauer et al., *Adv. Chem. Ser.*, 99, 251 (1971), report transparent blends which were prepared from poly(methyl methacrylate) and diene elastomers. Skochdopole et al., et al., *Polym. Engr. Sci.*, 27, 627 (1987), reported a blend of polycarbonate and styrene-acrylonitrile which was transparent due to a near match of the refractive indices of the two materials. Tse et al., *J. Appl. Polym. Sci.*, 42, 1205 (1991), disclosed blends of poly(vinyl chloride) and chlorinated polyethylene which were translucent due to a close match of refractive indicies.

Clear composites have been reported also. See Breuer and Grzesitza, *Die Angew. Makromol. Chemie*, 45, 1 (1975). U.S. Pat. No. 4,581,288 (1986) disclosed lens materials which were composites of glass and plastic with refractive indices matched to ±0.0020. U.S. Pat. No. 3,441,525 [1969] disclosed glass composites based on diallylic phthalate polymers where the refractive indices were sufficiently matched to yield clear materials. Lin et al., *Polym. Engr. Sci.*, 37, 344 (1992) reported the preparation of transparent poly-(methyl methacrylate) composites by matching the refractive index of the glass fiber reinforcement to the refractive index of the poly(methyl methacrylate) matrix.

There is a need in the art for visually clear, two-phase blends which are particularly useful in applications requiring tough weather resistant material.

SUMMARY OF THE INVENTION

This invention relates to clear blends of aliphatic or cycloaliphatic polyesters with acrylic polymers.

More particularly this invention relates to a composition which is a visually clear, two-phase blend of thermoplastic polymers comprising:

(A) from 99% to 1% by weight of an aliphatic or cycloaliphatic polyester or copolyester and (B) from 1% to 99% by weight of an acrylic polymer or copolymer, wherein an article prepared from said blend has a diffuse transmittance value of 40% or greater as determined by ASTM Method D1003.

The absolute value of the difference in refractive indices for Components (A) and (B) of the invention is less than about 0.008.

Visually clear, immiscible blends of acrylic polymers with aliphatic polyesters are not believed to have been disclosed in the prior art.

DETAILED DESCRIPTION OF THE INVENTION

The composition of the invention is a visually clear blend of thermoplastic polymers comprising:

(A) from 99% to 1, preferably 85 to 20, more preferably 80 to 20, even more preferably 60 to 40 percent by weight of an aliphatic or cycloaliphatic polyester or copolyester and (B) from 1% to 99, preferably 15 to 80, more preferably 20 to 80 percent, even more preferably 40 to 60 percent by weight of an acrylic polymer or copolymer, wherein an article prepared from said blend has a diffuse transmittance value of 40% or greater as determined by ASTM Method D1003.

The aliphatic or cycloaliphatic polyester or copolyester of Component (A) comprises:

(1) an acid (or equivalent ester) portion selected from the group of aliphatic and cycloaliphatic acids comprising at least one of the following acids:

oxalic acid malonic acid succinic acid glutaric acid adipic acid pimelic acid suberic acid azelaic acid sebacic acid cis- or trans-1,4-cyclohexanedicarboxylic acid and (2) a glycol portion selected from the group of aliphatic and cycloaliphatic glycols comprising at least one of the following glycols ethylene glycol 1,3-trimethylene glycol 1,4-butanediol 1,5-pentanediol 1,6-hexanediol 1,7-heptanediol 1,8-octanediol 1,9-nonanediol neopentyl glycol cis- and trans cyclohexanedimethanol cis- and trans-2,2,4,4-tetramethyl-1,3-cyclobutanediol diethylene glycol Aromatic acids and glycols may also be added, depending on the overall composition of the aliphatic or cycloaliphatic polyester, and the composition of the acrylic with which it is being blended. These polyesters may be prepared by methods well known in the art, for example, methods similar to those described in U.S. Pat. Nos. 2,647,885; 2,643,989; 2,534,028; 2,578,660; 2,742,494; and 2,901,466.

The inherent viscosity of the aliphatic or cycloaliphatic polyester or copolyester is preferably, at least 0.3 dL/g, and more preferably, 0.5 dL/g or more.

The acrylic polymer is comprised of monomers or mixtures of monomers including, but not limited to:

methyl acrylate methyl methacrylate ethyl acrylate ethyl methacrylate butyl acrylate butyl methacrylate cyclohexylacrylate cyclohexylmethacrylate styrene methylstyrene and other monomers known to function in a similar manner to any of the monomers listed above. These acrylic polymers may be prepared by methods which are well known in the art. See *Encyclopedia of Polymer Science and Technology*, John Wiley & Sons (1985).

The inherent viscosity of the acrylic polymer or copolymer is preferably 0.2 dL/g and more preferably, 0.4 dL/g, or more.

It is preferable that articles prepared from the blends of the invention are visually clear having a diffuse transmittance value of greater than about 60% or more preferably, greater than 80%, as determined by ASTM Method D1003.

Component (A) is preferably a polyester prepared by the reaction of: (1) trans-1,4-cyclohexanedicarboxylic acid for the acid portion and 2,2,4,4,-tetramethyl-1,3-cyclobutanediol and 1,4-cyclohexanedimethanol for the diol or glycol portion, (2) trans-1,4-cyclohexane-dicarboxylic acid for the acid portion and diethylene glycol for the diol or glycol portion, (3) trans-1,4-cyclohexanedicarboxylic acid for the acid portion and neopentyl glycol for the diol or glycol portion, (4) adipic acid for the acid portion and 1,4-cyclohexanedimethanol for the diol or glycol portion, (5) adipic acid and sebacic acid for the acid portion and 1,4-cyclohexanedimethanol for the diol or glycol portion, (6) a mixture of trans-1,4-cyclohexanedicarboxylic acid and cis-1,4-cyclohexanedicarboxylic acid for the acid portion and 2,2,4,4,-tetramethyl-1,3-cyclobutanediol for the diol or glycol portion.

It is preferred that Component (B) comprises methyl methacrylate), cyclohexylmethacrylate, methyl acrylate, butyl acrylate and styrene or blends thereof. Methyl methacrylate and cyclohexylmethacrylate are preferred.

The following blends are particularly preferred within the scope of this invention:

(1) (A) a polyester consisting of 1,4-cyclohexanedicarboxylic acid and 90–50 mole %, preferably 80–60 mole % of 2,2,4,4-tetramethyl-1,3-cyclobutanediol, and 10–50 mole %, preferably 20–40 mole % of 1,4-cyclohexanedimethanol; and (B) poly(methyl methacrylate);

(2) (A) a polyester consisting of 1,4-cyclohexanedicarboxylic acid and 40–1 mole %; preferably 30–10 mole % of 2,2,4,4-tetramethyl-1,3-cyclobutanediol, and 60–99 mole %; preferably 70–90 mole % of 1,4-cyclohexanedimethanol; and (B) Poly(cyclohexylmethacrylate);

(3) (A) a polyester consisting of 1,4-cyclohexanedicarboxylic acid and a glycol selected from the group consisting of neopentyl glycol and diethylene glycol; and (B) poly(methyl methacrylate);

(4) (A) a polyester consisting of 1,4-cyclohexanedicarboxylic acid and 40–60 mole % 1,6-hexanediol and 60–40 mole % 1,8-octanediol; and (B) poly(methyl methacrylate);

(5) (A) a polyester consisting of 40–60 mole % trans-1,4-cyclohexanedicarboxylic acid and 60–40 mole % cis-1,4-cyclohexanedicarboxylic acid and 2,2,4,4-tetramethyl-1,3-cyclobutanediol; and (B) poly(methyl methacrylate);

(6) (A) a polyester consisting of 40–60 mole % trans-1,4-cyclohexanedicarboxylic acid and 60–40 mole % cis-1,4-cyclohexanedicarboxylic acid and 2,2,4,4-tetramethyl-1,3-cyclobutanediol; and (B) poly(methyl methacrylate) and methyl acrylate;

(7) (A) a polyester consisting of 40–60 mole % trans-1,4-cyclohexanedicarboxylic acid and 60–40 mole % cis-1,4-cyclohexanedicarboxylic acid and 2,2,4,4-tetramethyl-1,3-cyclobutanediol; and (B) 65–85 mole % methyl acrylate and 35–15 mole % cyclohexylmethacrylate; and (8) (A) a polyester consisting of 40–60 mole % trans-1,4-cyclohexanedicarboxylic acid and 60–40 mole % cis-1,4-cyclohexanedicarboxylic acid and 2,2,4,4-tetramethyl-1,3-cyclobutanediol; and (B) 65–85 mole %, preferably 70–80 mole %, methyl acrylate and 35–15 mole %, preferably 30–20 mole %, cyclohexylmethacrylate.

In general, in order to obtain a visually clear, immiscible blend of the aliphatic or cycloaliphatic polyester and acrylic polymer, the refractive indices of the two polymers should not differ by an absolute value of more than about 0.008, preferably 0,006, more preferably 0.004, or lower. However, the maximum difference in refractive index which may be tolerated depends on the blend composition, particle diameter, refractive index, wavelength, and particle structure as described by Biangardi et al., *Die Angew. Makromole. Chemie*, 183, 221 (1990).

The aliphatic polyester may be a homopolymer of one acid and one glycol or a copolymer of one or more acids and/or one or more glycols. The acrylic polymer may be a homopolymer or a copolymer of two or more acrylic monomers.

These blends may be prepared by any method known in the art. These blends may be compounded in the melt, for example, by using a single screw or twin screw extruder. They may also be prepared by blending in solution. Additional components such as stabilizers, flame retardants, colorants, lubricants, release agents, impact modifiers, and the like may also be incorporated into the formulation.

These blends are useful as thermoplastic molding compositions.

Whenever the term "inherent viscosity" (I.V.) is used in this application, it will be understood to refer to viscosity determinations made at 25° C. using 0.5 grams of polymer per 100 ml of a solvent comprising 60 weight phenol and 40 weight % tetrachloroethane.

The term "absolute value" as used herein is defined as the mathematical term relating to real numbers where the absolute value is the value irrespective of sign. The term "absolute value" as referred to herein relates to differences in refractive indices of two polymers.

A "visually clear" blend is defined herein as one where the article made therefrom has a diffuse transmittance value of about 40% or greater. An "opaque" or "cloudy" blend is defined as one where the article made therefrom has a diffuse transmittance value of less than about 40%.

The diffuse transmittance of the injection molded articles formed from the blends of the invention is determined by ASTM Method D1003.

This invention can be further illustrated by the following examples of preferred embodiments thereof, although it will be understood that these examples are included merely for purposes of illustration and are not intended to limit the scope of the invention unless otherwise specifically indicated.

EXAMPLES

In the following examples, refractive indices were measured on polymer films using a refractometer.

Example 1

Blends of aliphatic polyesters with a commercial poly(methyl methacrylate) were prepared and analyzed for clarity. The composition of the blends was 50% by weight aliphatic polyester and 50% by weight poly(methyl methacrylate). The blends were prepared in methylene chloride solution and then precipitated into methanol. The precipitate was collected and dried overnight under vacuum at 50° C. The samples were then compression molded at 200° C. into plaques 0.125 inches thick.

The poly(methyl methacrylate) used was Acrylite H12, obtained from Cyro Industries of Mount Arlington, N.J. Its measured refractive index was 1.491.

Four copolyesters were prepared by polymerization in the melt. The compositions of the polyesters along with the measured refractive indices are given in Table 1.1.

TABLE 1.1

Polyesters of Example 1

| Example # | Acid Portion | Glycol Portion | Measured Refractive Index |
|---|---|---|---|
| A | trans-1,4-cyclohexanedicarboxylic acid | 80 mol % 2,2,4,4-tetramethyl-1,3-cyclobutanediol 20 mol % 1,4-cyclohexanedimethanol | 1.493 |
| 1B | trans-1,4-cyclohexanedicarboxylic acid | 60 mol % 2,2,4,4-tetramethyl-1,3-cyclobutanediol 40 mol % 1,4-cyclohexanedimethanol | 1.497 |
| 1C | trans-1,4-cyclohexanedicarboxylic acid | 30 mol % 2,2,4,4-tetramethyl-1,3-cyclobutanediol 70 mol % 1,4-cyclohexanedimethanol | 1.503 |
| 1D | trans-1,4-cyclohexanedicarboxylic acid | 10 mol % 2,2,4,4-tetramethyl-1,3-cyclobutanediol 90 mol % 1,4-cyclohexanedimethanol | 1.507 |

The aliphatic polyesters may be prepared by techniques well known in the art. The clarity of the blends which were compression molded into plaques is shown in Table 1.2. Scanning electron microscopy and transmission electron microscopy of the blends confirmed that two polymeric phases were present.

TABLE 1.2

Clarity of the blends of Example 1 in Compression Molded Plaques

| Example # | Blend Clarity | Difference in Refractive Indices |
|---|---|---|
| 1A | Clear | 0.002 |
| 1B | Clear | 0.006 |
| 1C | Cloudy | 0.012 |
| 1D | Cloudy | 0.016 |

This example illustrates blends of aliphatic polyesters and poly(methyl methacrylate) which were visually clear or cloudy depending on the difference in refractive index between the components. The blends in which the refractive index difference was less than about 0.008 were visually clear while those in which the refractive index difference was greater than about 0.008 were cloudy. Additionally, this example illustrates the importance of the polyester composition in obtaining a visually clear blend.

Example 2

Blends of aliphatic polyesters with a poly(cyclohexyl methacrylate) were prepared and analyzed for clarity. The composition of the blends was 50% by weight aliphatic polyester and 50% by weight poly(cyclohexylmethacrylate). The blends were prepared in methylene chloride solution and then precipitated into methanol. The precipitate was collected and dried overnight under vacuum at 50° C. The samples were then compression molded at 200° C. into plaques 0.125 inches thick.

The poly(cyclohexylmethacrylate) used was purchased from Polysciences of Niles, Ill. Its measured refractive index was 1,507.

Four copolyesters, 2A–2D, were prepared by polymerization in the melt. These were the same polyesters used in Example 1 as 1A–D, respectively. The composition of the polyesters along with the measured refractive indices are given in Table 1.1.

The clarity of the blends which were compression molded into plaques is shown in Table 2.1. Scanning electron microscopy and transmission electron microscopy of the blends confirmed that two polymeric phases were present.

TABLE 2.1

Clarity of the blends of Example 2 in Compression Molded Plaques

| Example # | Blend Clarity | Difference in Refractive Indices |
|---|---|---|
| 2A | Cloudy | 0.014 |
| 2B | Cloudy | 0.010 |
| 2C | Clear | 0.004 |
| 2D | Clear | 0.000 |

This example illustrates blends of polyesters and poly(cyclohexylmethacrylate) which were visually clear or cloudy depending on the difference in refractive index between the components. The blends in which the refractive index difference was less than about 0.008 were visually clear while those in which the refractive index difference was greater than about 0.008 were cloudy. Additionally, this example illustrates the importance of the polyester composition in obtaining a visually clear blend. Comparison of Examples 1 and 2 demonstrates the importance of the composition of the acrylic in obtaining a visually clear blend.

Example 3

Blends of various polyesters with a commercial poly(methyl methacrylate) were prepared and analyzed for clarity. The composition of the blends was 80% by weight poly(methyl methacrylate) and 20% by weight polyester. The blends were prepared in methylene chloride solution and then precipitated into methanol. The precipitate was collected and dried overnight under vacuum at 50° C. The samples were then compression molded at 200° C. into plaques 0.125 inches thick.

The poly(methyl methacrylate) used was Acrylite H12, obtained from Cyro Industries of Mount Arlington, N.J. Its measured refractive index was 1.491.

The polyesters and copolyesters were prepared by polymerization in the melt. The polyesters may be prepared by techniques well known in the art. The composition of the polyesters along with the observed clarity of the blends are given in Table 3.1.

TABLE 3.1

Clarity of Blends of Polyesters with Poly(methyl methacrylate) for Example 3.

| Example # | Acid Portion | Glycol Portion | Visual Appearance |
|---|---|---|---|
| 3A | trans-1,4-cyclohexanedicarboxylic acid | hydroquinone | Opaque |
| 3B | trans-1,4-cyclohexanedicarboxylic acid | ethylene glycol | Opaque |
| 3C | trans-1,4-cyclohexanedicarboxylic acid | diethylene glycol | Clear |
| 3D | trans-1,4-cyclohexanedicarboxylic acid | 50 mol % 1,6-hexanediol 50 mol % 1,8-octanediol | Clear |
| 3E | trans-1,4-cyclohexanedicarboxylic acid | neopentyl glycol | Clear |
| 3F | 50 mol % terephthalic acid 50 mol % isophthalic acid | neopentyl glycol | Opaque |
| 3G | adipic acid | 1,4-cyclohexanedimethanol | Clear |
| 3H | 50 mol % adipic acid 50 mol % sebacic acid | 1,4-cyclohexanedimethanol | Clear |
| 3I | 50 mol % terephthalic acid 50 mol % isophthalic acid | 1,4-cyclohexanedimethanol | Opaque |

Examples 3A through 3E show the results for blends where the polyester was prepared from trans-1,4-cyclohexanedicarboxylic acid. The fact that some blends are clear and some are opaque demonstrates the importance of proper selection of the glycol in order to obtain a visually clear blend. In Examples 3E and 3F both of the polyesters were prepared from neopentyl glycol. However, only Example 3E is a clear blend. This example also demonstrates the importance of selecting the proper acid. A similar observation may be made when considering Examples 3G through 3I.

Example 4—Counter Example

Blends of aromatic polyesters with a commercial poly(methyl methacrylate) were prepared and analyzed for clarity. The composition of the blends was 75% by weight polyester and 25% by weight poly(methyl methacrylate). The blends were prepared by mixing in the melt using a Werner and Pfleiderer 28 mm twin screw extruder. The blends were then injection molded using a Toyo 90 injection molding machine into plaques 0.125 inches thick. The melt temperatures used during processing were between 260° C. and 300° C.

The poly(methyl methacrylate) used was Acrylite H12, obtained from Cyro Industries of Mount Arlington, N.J. Its measured refractive index was 1.491.

Five polyesters and copolyesters were prepared by polymerization in the melt. The composition of the polyesters along with the measured refractive indices are given in Table 4.1.

| 4.1 Polyesters of Example 4. | | | |
|---|---|---|---|
| Example # | Acid Portion | Glycol Portion | Measured Refractive Index |
| 4A | terephthalic acid | 100 mol % ethylene glycol | 1.575 |
| 4B | terephthalic acid | 69 mol % ethylene glycol 31 mol % 1,4-cyclohexanedimethanol | 1.568 |
| 4C | terephthalic acid | 45 mol % ethylene glycol 55 mol % 1,4-cyclohexanedimethanol | 1.562 |
| 4D | terephthalic acid | 19 mol % ethylene glycol 81 mol % 1,4-cyclohexanedimethanol | 1.556 |
| 4E | terephthalic acid | 100 mol % 1,4-cyclohexanedimethanol | 1.552 |

The polyesters were prepared by techniques well known in the art. The clarity of the blends which were injection molded into plaques is shown in Table 4.2.

TABLE 4.2

Clarity of the blends of Example 4 in Injection Molded Plaques

| Example # | Blend Clarity | Difference in Refractive Indices |
|---|---|---|
| 4A | Opaque | 0.084 |
| 4B | Opaque | 0.077 |
| 4C | Opaque | 0.071 |
| 4D | Opaque | 0.065 |
| 4E | Opaque | 0.061 |

This example illustrates several cases where blends of polyesters with an acrylic are opaque materials. In all of these blends there was a large refractive index difference between the components and the blends were observed to be opaque. Comparison with Examples 1 and 3 illustrate the importance of proper selection of the polyester in order to obtain a visually clear blend.

Example 5

Blends of various acrylics with a polyester were prepared and characterized. The polyester used was prepared from 2,2,4,4-tetramethyl-1,3-cyclobutanediol and a mixture of 50 mol % trans-1,4-cyclohexanedicarboxylic acid and 50 mol % cis-1,4-cyclohexane-dicarboxylic acid. This polyester was prepared by polymerization in the melt. The refractive index of the polyester was measured at 1.488. The composition of the blends was 80% by weight polyester and 20% by weight acrylic. The blends were prepared in methylene chloride solution and then precipitated into methanol. The precipitate was collected and dried overnight under vacuum at 50° C. The samples were then compression molded at 200° C. into plaques 0.125 inches thick.

The acrylic copolymers were prepared using a mixture of monomers. The acrylic composition along with observations of the blend clarity are presented in Table 5.1

TABLE 5.1

Clarity of Blends of Various Acrylics with a Particular Polyester for Example 5

| Example # | Monomer Composition | Blend Appearance |
|---|---|---|
| 5A | 100 mol % methyl methacrylate | Clear |
| 5B | 80 mol % methyl methacrylate 20 mol % methyl acrylate | Clear |
| 5C | 100 mol % cyclohexylmethacrylate | Opaque |
| 5D | 75 mol % methyl acrylate 25 mol % cyclohexylmethacrylate | Clear |
| 5E | 100 mol % styrene | Opaque |
| 5F | 80 mol % butyl acrylate 20 mol % styrene | Clear |

Examples 5A shows the result for a clear blend with poly(methyl methacrylate). The addition of a small amount of methyl acrylate comonomer in Example 5B results in an acrylic polymer which still forms a clear blend with the polyester. Example 5C shows a visually opaque blend of the polyester with poly(cyclohexylmethacrylate). However, Example 5D demonstrates that the addition of a significant amount of another comonomer to the acrylic then results in a blend that is clear.

The fact that some blends are clear and some are opaque demonstrates the importance of proper selection of the acrylic polymer. This Example further demonstrates that a wide range of different acrylics may form visually clear blends with a particular polyester.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

I claim:

1. A two-phase blend comprising:
   (A) from 99% to 1% by weight of cycloaliphatic polyester or copolyester, and
   (B) from 1% to 99% by weight of an acrylic polymer or copolymer,
      wherein components (A) and (B) of said blend are selected from one of the following combinations:
   (1) (A) a polyester consisting of 1,4-cyclohexanedicarboxylic acid and 90–50 mole % of 2,2,4,4-tetramethyl-1,3-cyclobutanediol, and 10–50 mole % of 1,4-cyclohexanedimethanol; and
      (B) poly(methyl methacrylate);
   (2) (A) a polyester consisting of 1,4-cyclohexanedicarboxylic acid and 40-1 mole % of 2,2,4,4-tetramethyl-1,3-cyclobutanediol, and 60–99 mole % of 1,4-cyclohexanedimethanol; and
      (B) poly(cyclohexylmethacrylate);
   (3) (A) a polyester consisting of 1,4-cyclohexanedicarboxylic acid and a glycol selected from the group consisting of neopentyl glycol and ethylene glycol; and
      (B) poly(methyl methacrylate);
   (4) (A) a polyester consisting of 1,4-cyclohexanedicarboxylic acid and 40–60 mole % 1,6-hexanediol and 60–40 mole % 1,8-octanediol; and
      (B) poly(methyl methacrylate);
   (5) (A) a polyester consisting of 40–60 mole % trans-1,4-cyclohexanedicarboxylic acid and 60–40 mole % cis-1,4-cyclohexanedicarboxylic acid and 2,2,4,4-tetramethyl-1,3-cyclobutanediol; and
      (B) poly(methyl methacrylate);
   (6) (A) a polyester consisting of 40–60 mole % trans-1,4-cyclohexanedicarboxylic acid and 60–40 mole % cis-1,4-cyclohexanedicarboxylic acid and 2,2,4,4-tetramethyl-1,3-cyclobutanediol; and
      (B) poly(methyl methacrylate) and methyl acrylate;
   (7) (A) a polyester consisting of 40–60 mole % trans-1,4-cyclohexanedicarboxylic acid and 60–40 mole % cis-1,4-cyclohexanedicarboxylic acid and 2,2,4,4-tetramethyl-1,3-cyclobutanediol; and
      (B) 65–85 mole % methyl acrylate and 35–15 mole % cyclohexyl methacrylate; and
   (8) (A) a polyester consisting of 40–60 mole % trans-1,4-cyclohexanedicarboxylic acid and 60–40 mole % cis-1,4-cyclohexanedicarboxylic acid and 2,2,4,4-tetramethyl-1,3-cyclobutanediol; and
      (B) 70–90 mole % butyl acrylate and 30–10 mole % styrene, and
   further wherein an article prepared from said blend is visually clear having a diffuse transmittance value of 40% or greater as determined by ASTM Method D1003.

2. A blend according to claim 1 comprising:
   (A) a polyester consisting of 1,4-cyclohexanedicarboxylic acid and 90–50 mole % of 2,2,4,4-tetramethyl-1,3-cyclobutanediol, and 10–50 mole % of 1,4-cyclohexanedimethanol; and
   (B) poly(methyl methacrylate).

3. A blend according to claim 1 comprising:
   (A) a polyester consisting of 1,4-cyclohexanedicarboxylic acid and 40-1 mole % of 2,2,4,4-tetramethyl-1,3-cyclobutanediol, and 60–99 mole % of 1,4-cyclohexanedimethanol; and
   (B) poly(cyclohexylmethacrylate).

4. A blend according to claim 1 comprising:
   (A) a polyester consisting of 1,4-cyclohexanedicarboxylic acid and a glycol selected from the group consisting of neopentyl glycol and ethylene glycol; and
   (B) poly(methyl methacrylate).

5. A blend according to claim 1 comprising:
   (A) a polyester consisting of 1,4-cyclohexanedicarboxylic acid and 40–60 mole % 1,6-hexanediol and 60–40 mole % 1,8-octanediol; and
   (B) poly(methyl methacrylate).

6. A blend according to claim 1 comprising:
   (A) a polyester consisting of 40–60 mole % trans- 1,4-cyclohexanedicarboxylic acid and 60–40 mole % cis-1,4-cyclohexanedicarboxylic acid and 2,2,4,4-tetramethyl-1,3-cyclobutanediol; and (B) poly(methyl methacrylate).

7. A blend according to claim 1 comprising: (A) a polyester consisting of 40–60 mole % trans- 1,4-cyclohexanedicarboxylic acid and 60–40 mole % cis-1,4-cyclohexanedicarboxylic acid and 2,2,4,4-tetramethyl-1,3-cyclobutanediol; and (B) poly(methyl methacrylate) and methyl acrylate.

8. A blend according to claim 1 comprising:

(A) a polyester consisting of 40–60 mole % trans- 1,4-cyclohexanedicarboxylic acid and 60–40 mole % cis-1,4-cyclohexanedicarboxylic acid and 2,2,4,4-tetramethyl-1,3-cyclobutanediol; and (B) 65–85 mole % methyl acrylate and 35–15 mole % cyclohexylmethacrylate.

9. A blend according to claim 1 comprising:

(A) a polyester consisting of 40–60 mole % trans- 1,4-cyclohexanedicarboxylic acid and 60–40 mole % cis-1,4-cyclohexanedicarboxylic acid and 2,2,4,4-tetramethyl-1,3-cyclobutanediol; and (B) 70–90 mole % butyl acrylate and 30–10 mole % styrene.

10. The blend according to claim 1 wherein Component (A) is present in the amount of 85% to 20% by weight and Component (B) is present in the amount of 15% to 80% by weight.

11. The blend according to claim 10 wherein Component (A) is present in the amount of 60% to 40% by weight and Component (B) is present in the amount of 40% to 60% by weight.

12. The blend according to claim 1 wherein said absolute value of the difference in refractive indices for Components (A) and (B) is 0.006 or less.

13. The blend according to claim 12 wherein the absolute value of the difference in refractive indices for Components (A) and (B) is less than about 0.008.

14. A thermoplastic molding composition comprising the blend according to claim 1.

* * * * *